United States Patent Office 2,705,244
Patented Mar. 29, 1955

2,705,244
ALICYCLIC AMIDE

Moses Wolf Goldberg, Upper Montclair, and Sidney Teitel, Nutley, N. J., assignors to Hoffmann-La Roche Inc., Nutley, N. J., a corporation of New Jersey No Drawing. Application September 18, 1953,
Serial No. 381,113

1 Claim. (Cl. 260—561)

This invention relates to a novel chemical compound, which can be designated N-[1-methyl-3-(2,6,6-trimethyl-1-cyclohexen-1-yl)propyl]-α-chloroacetamide and which can be represented by the following formula:

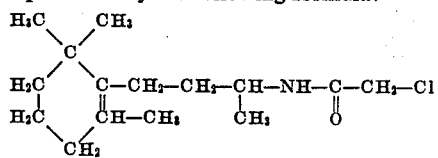

This compound is useful as a pharmaceutical and more particularly it is useful as an amoebicidal compound.

One method of preparing the compound of the invention is by reacting 1-methyl-3-(2,6,6-trimethyl-1-cyclohexen-1-yl)propylamine, which is disclosed in our prior Patent 2,483,381, issued September 27, 1949, with a chloroacetylating agent. The preparation of the compound is illustrated by the following example which is not to be deemed limitative of the invention.

Example

To 338 g. of 1-methyl-3-(2,6,6-trimethyl-1-cyclohexen-1-yl)-propylamine dissolved in 1.6 liters of ether was added 1 liter of water. While the mixture was vigorously stirred at 4°, 197 g. of chloroacetylchloride was added over a 2 hour period; 15 per cent aqueous sodium hydroxide was added as needed to maintain the pH at 8.5. After stirring for an additional half hour, the ether layer was separated off, washed with 1 per cent aqueous hydrochloric acid, then with water, and finally dried with sodium sulfate. The ether was distilled off, and the residual viscous oil was crystallized from 80 per cent ethanol, to give N-[1-methyl-3-(2,6,6-trimethyl-1-cyclohexen-1-yl)propyl]-α-chloroacetamide, M. P. 68–69° C.

We claim:

N-[1-methyl - 3 -(2,6,6-trimethyl - 1 - cyclohexen-1-yl)-propyl]-α-chloroacetamide.

No references cited.